Figure 5:
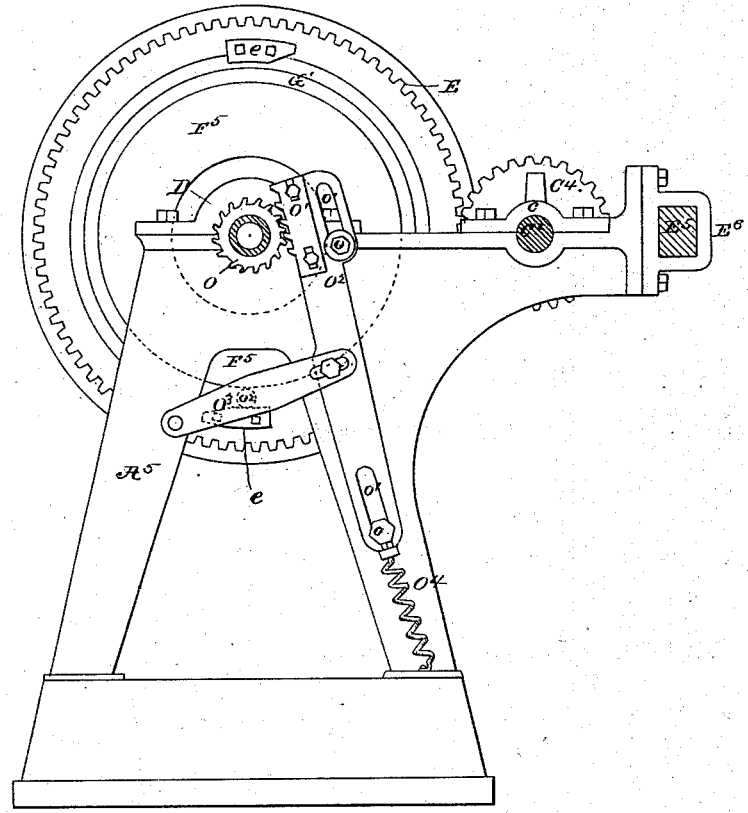

(No Model.)  
10 Sheets—Sheet 1.
O. P. BRIGGS & C. S. LOCKE.
BARBED FENCE WIRE MACHINE.
No. 315,470. Patented Apr. 14, 1885.
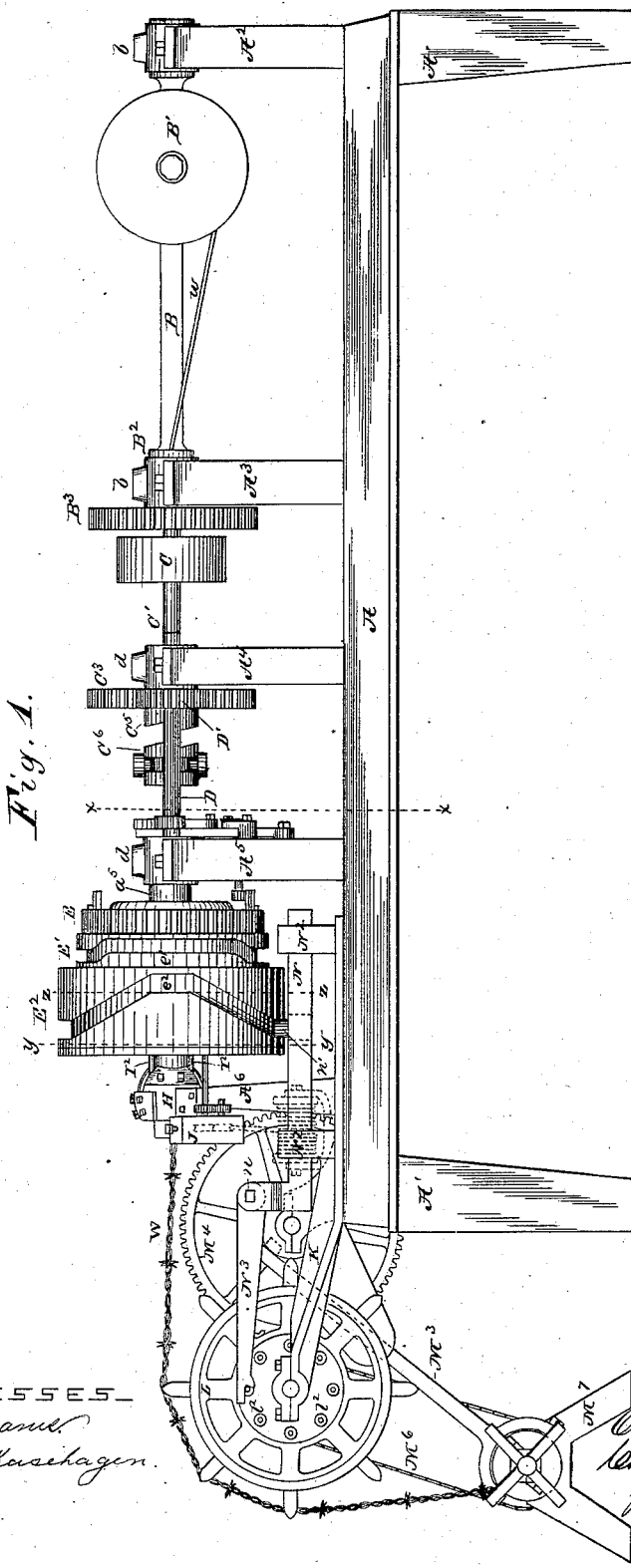

(No Model.) 10 Sheets—Sheet 2.
O. P. BRIGGS & C. S. LOCKE.
BARBED FENCE WIRE MACHINE.
No. 315,470. Patented Apr. 14, 1885.
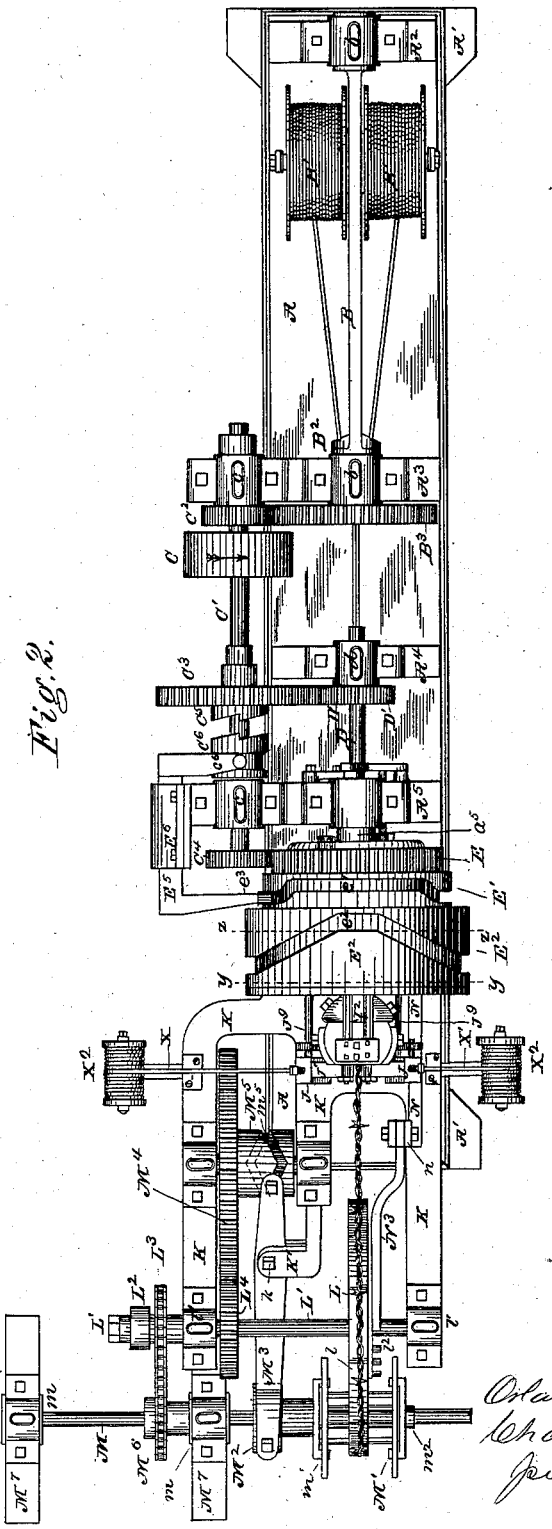

(No Model.) 10 Sheets—Sheet 3.
O. P. BRIGGS & C. S. LOCKE.
BARBED FENCE WIRE MACHINE.
No. 315,470. Patented Apr. 14, 1885.
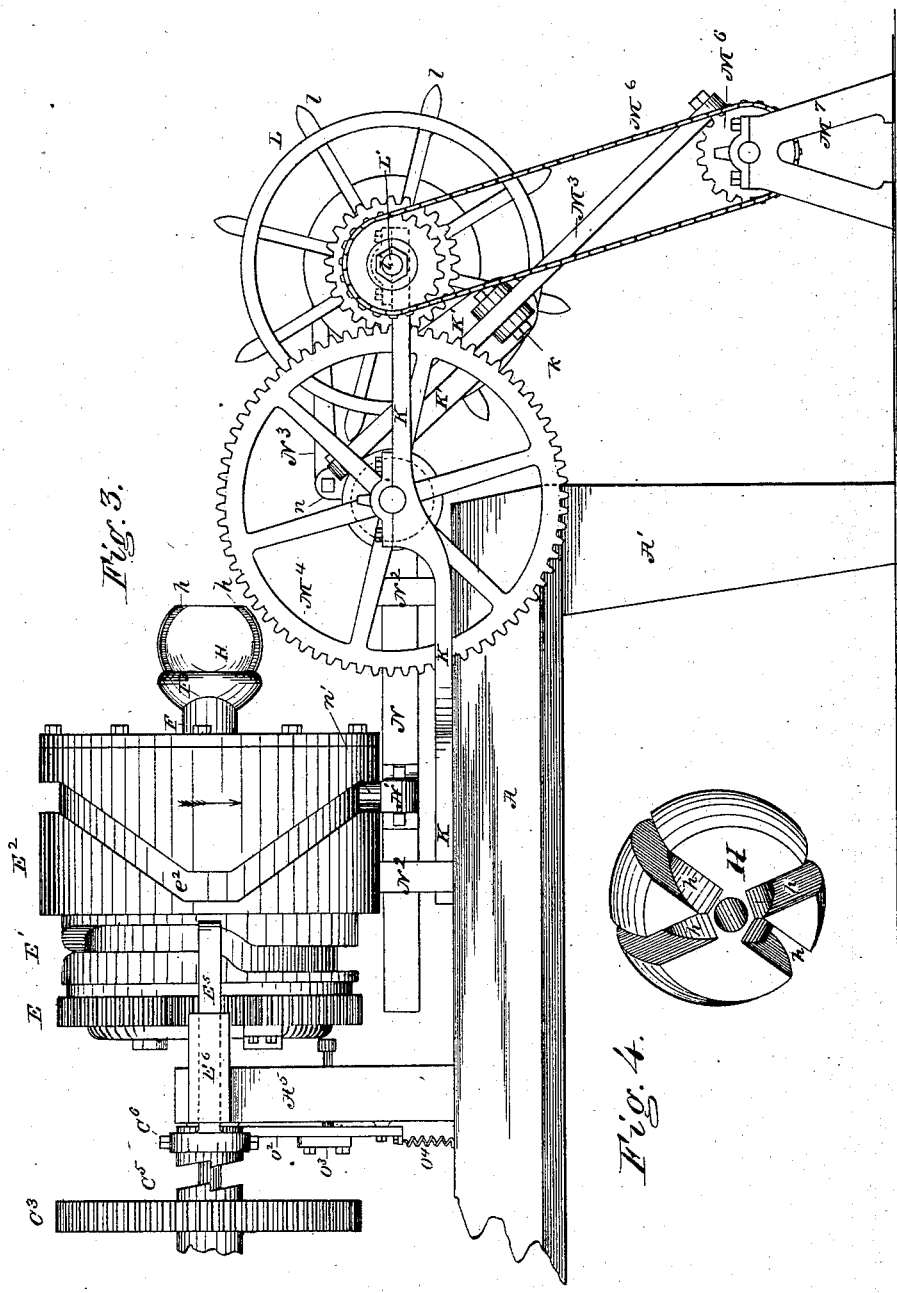

(No Model.) 10 Sheets—Sheet 4.
O. P. BRIGGS & C. S. LOCKE.
BARBED FENCE WIRE MACHINE.
No. 315,470. Patented Apr. 14, 1885.

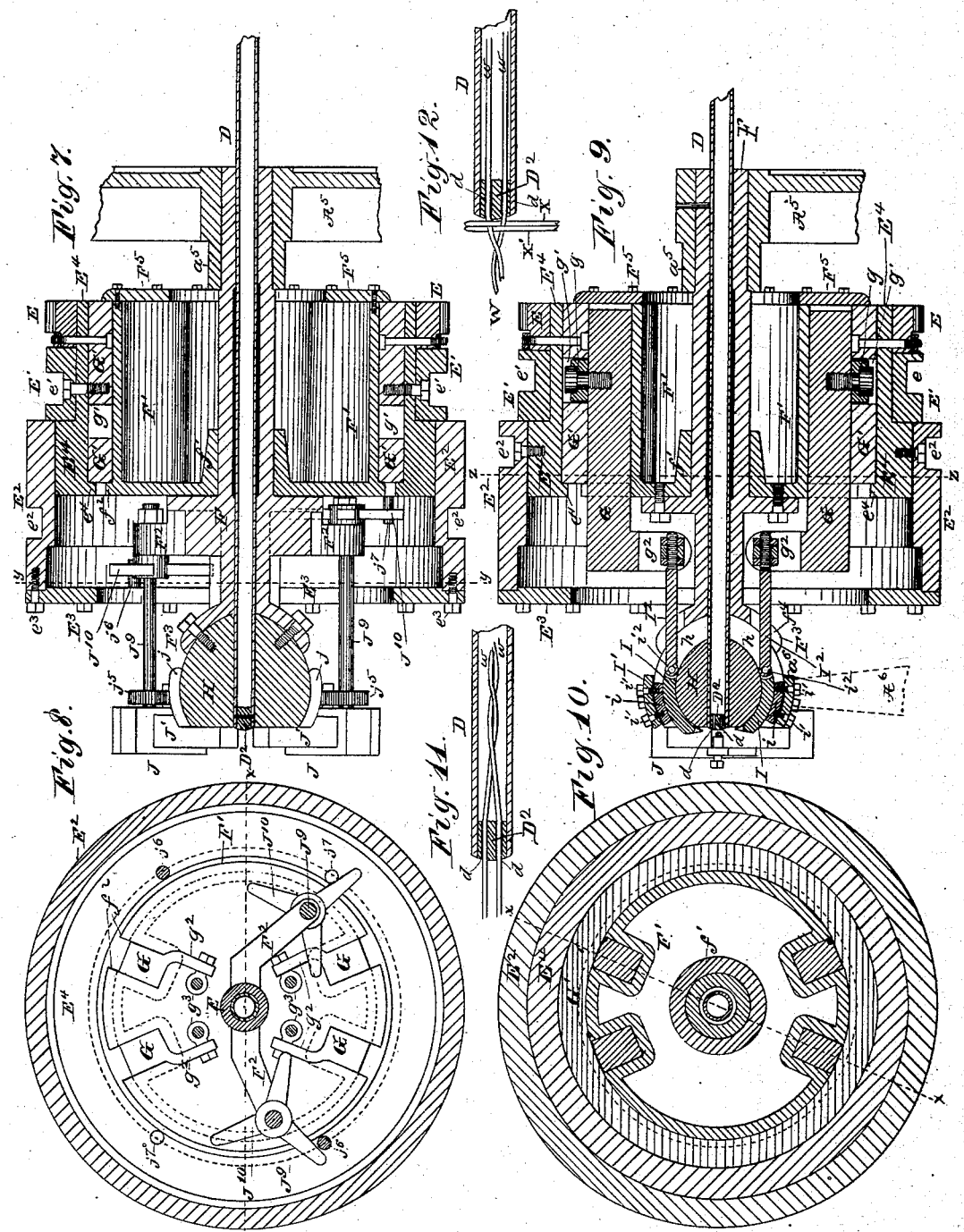

(No Model.) 10 Sheets—Sheet 6.
O. P. BRIGGS & C. S. LOCKE.
BARBED FENCE WIRE MACHINE.

No. 315,470. Patented Apr. 14, 1885.

WITNESSES
F. U. Adams
F. W. Kashagen

INVENTORS
Orlando P. Briggs
Charles S. Locke
per M. E. Dayton
Attorney (No Model.) 10 Sheets—Sheet 7.
O. P. BRIGGS & C. S. LOCKE.
BARBED FENCE WIRE MACHINE.
No. 315,470. Patented Apr. 14, 1885.
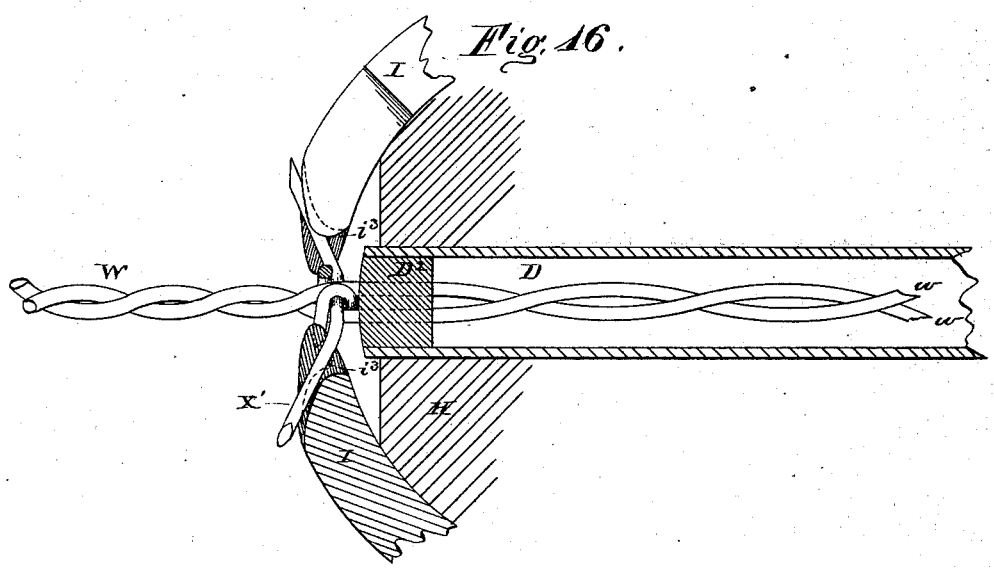
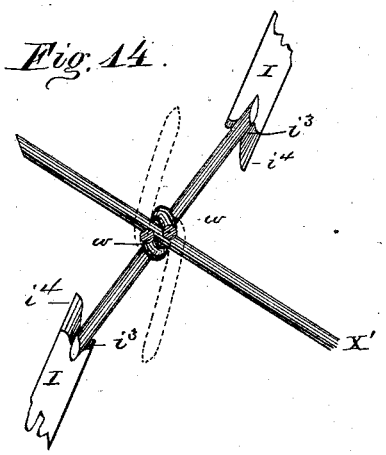
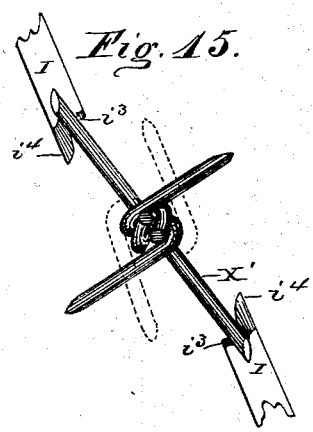

(No Model.)

O. P. BRIGGS & C. S. LOCKE.
BARBED FENCE WIRE MACHINE.

No. 315,470. Patented Apr. 14, 1885.

10 Sheets—Sheet 8.

WITNESSES
F. U. Adams
F. W. Kaschagen

INVENTORS
Orlando P. Briggs
Charles S. Locke
per M. E. Dayton
Attorney

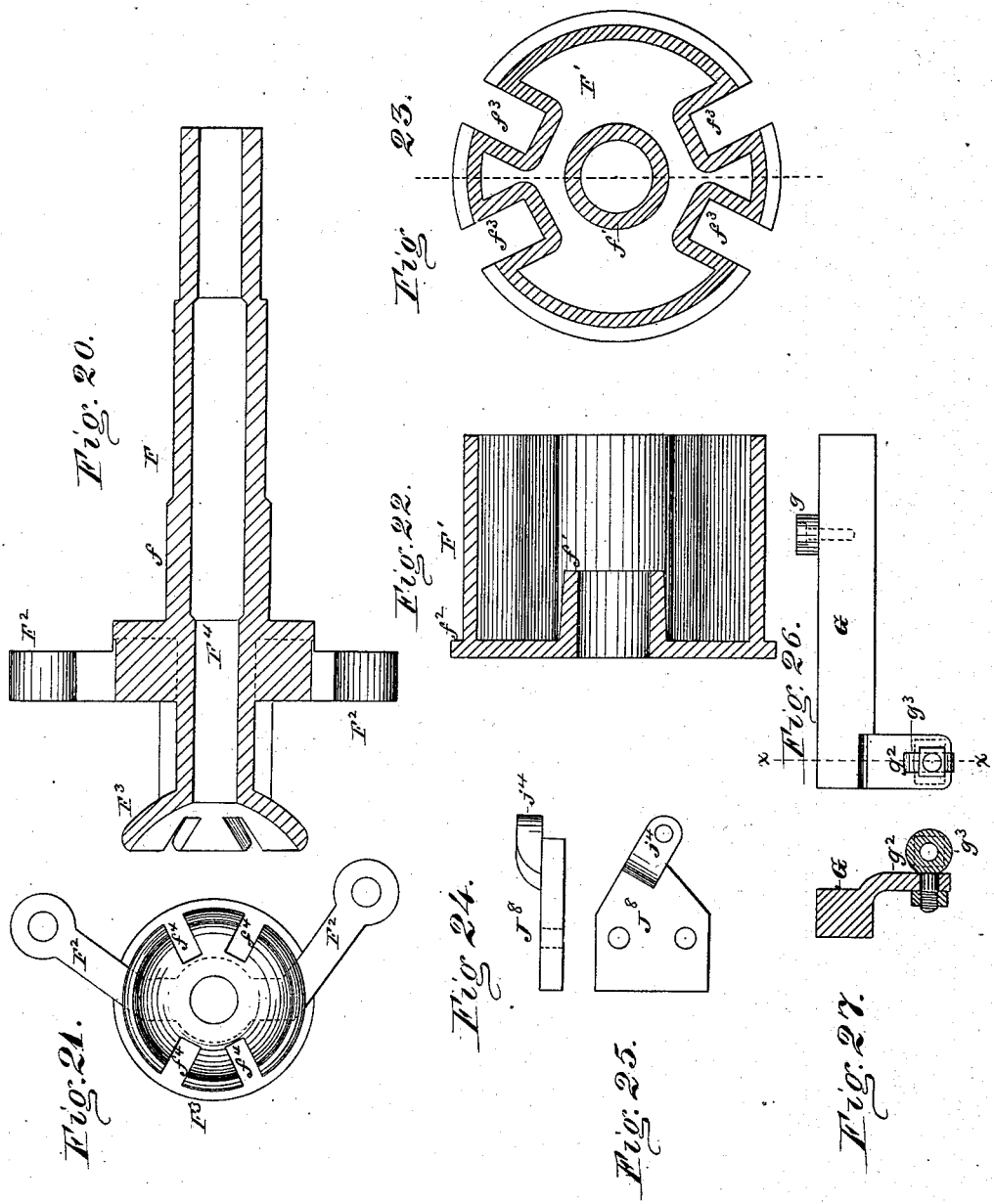

(No Model.) 10 Sheets—Sheet 10.

O. P. BRIGGS & C. S. LOCKE.
BARBED FENCE WIRE MACHINE.

No. 315,470. Patented Apr. 14, 1885.

WITNESSES
F. W. Adams
F. W. Kaukagen

INVENTORS
Orlando P. Briggs
Charles S. Locke
per M. E. Dayton
Attorney

N. PETERS, Photo-Lithographer, Washington, D. C.

UNITED STATES PATENT OFFICE.

ORLANDO P. BRIGGS, OF CHICAGO, AND CHARLES S. LOCKE, OF JOLIET, ASSIGNORS TO DAVID H. DONOVAN, OF CHICAGO, ILLINOIS.

BARBED FENCE-WIRE MACHINE.

SPECIFICATION forming part of Letters Patent No. 315,470, dated April 14, 1885.

Application filed June 1, 1882. Renewed September 20, 1884. (No model.)

*To all whom it may concern:*

Be it known that we, ORLANDO P. BRIGGS, of Chicago, Illinois, and CHARLES S. LOCKE, of Joliet, in the county of Will and State of Illinois, have invented certain new and useful Improvements in Machines for Making Barbed Fence-Wire; and we do hereby declare that the following is a full, clear, and exact description thereof, reference being had to the accompanying drawings and to the letters of reference marked thereon, which form a part of this specification.

This invention relates to automatic machinery for producing barbed cable fence-wire; and it consists in the several features of construction hereinafter described and claimed.

Some of the devices in the machine which form the subject of this patent have reference to the production of a particular form of barb, but others are adapted to use in connection with other forms of barbing mechanism.

The machine as here shown makes a two-strand wire, and, like most others for making twisted wire, receives the plain fence-wire on spools of a flier at one end of the structure, which flier is in continuous motion, producing a twist. The twisted wire passes from the flier-head into a tube provided with a plug in its remote end, in which plug are apertures through which the wires of the cable separately pass. Said tube rotates intermittently in the same direction as the flier, but more rapidly, whereby that part of the fence-wire intervening between the flier-head and the apertured plug is untwisted periodically, so as to allow the wires to be fed forward, and also to produce the permanent twist in the cable beyond the apertured plug. The feeding forward of the fence-wire is also intermittent, taking place when the untwisting above referred to is effected sufficiently to permit the wires to be drawn through the plug, and the barb-applying mechanism comes into operation immediately after the fence-wire is advanced and when said wire is longitudinally at rest. The barb herein provided for is four-pointed, and is produced from two wires made to intersect each other and the fence-wire just outside the apertured plug spoken of, the material for said barbs being fed intermittently in the form of continuous wires and cut off by two of the barb-formers, which are of peculiar construction. Beyond or following the barbing devices are located the mechanisms for intermittently feeding and spooling the finished barb-wire. The several mechanisms for producing the various operations mentioned are so connected as to act consecutively and in proper order, being driven from a single shaft.

A distinctive feature of our invention consists in the arrangment of the reciprocating parts, through the medium of which the several principal intermittently-moving parts are actuated in the same longitudinal direction with each other and with the fence-wires, and in the arrangement of the cams by which these reciprocating parts are actuated upon a common longitudinal axis, which is also the axis of the fence-wires. The flier, though independent of the cams, is also on the same axis as the cams, giving a direct horizontal course to the fence-wires through the machine, and enabling the cams and flier to be driven from a parallel shaft directly actuated from the motor.

Figure 6:
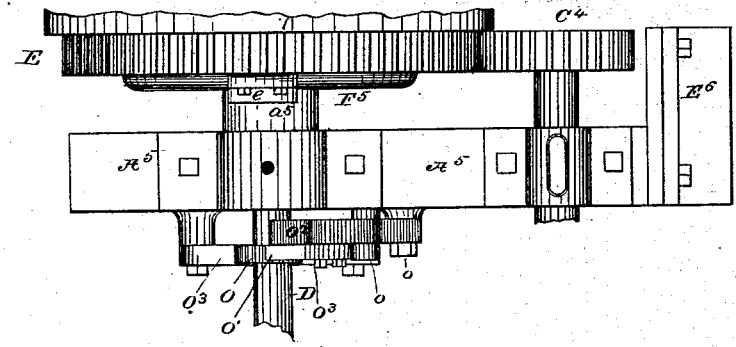
Figure 13:
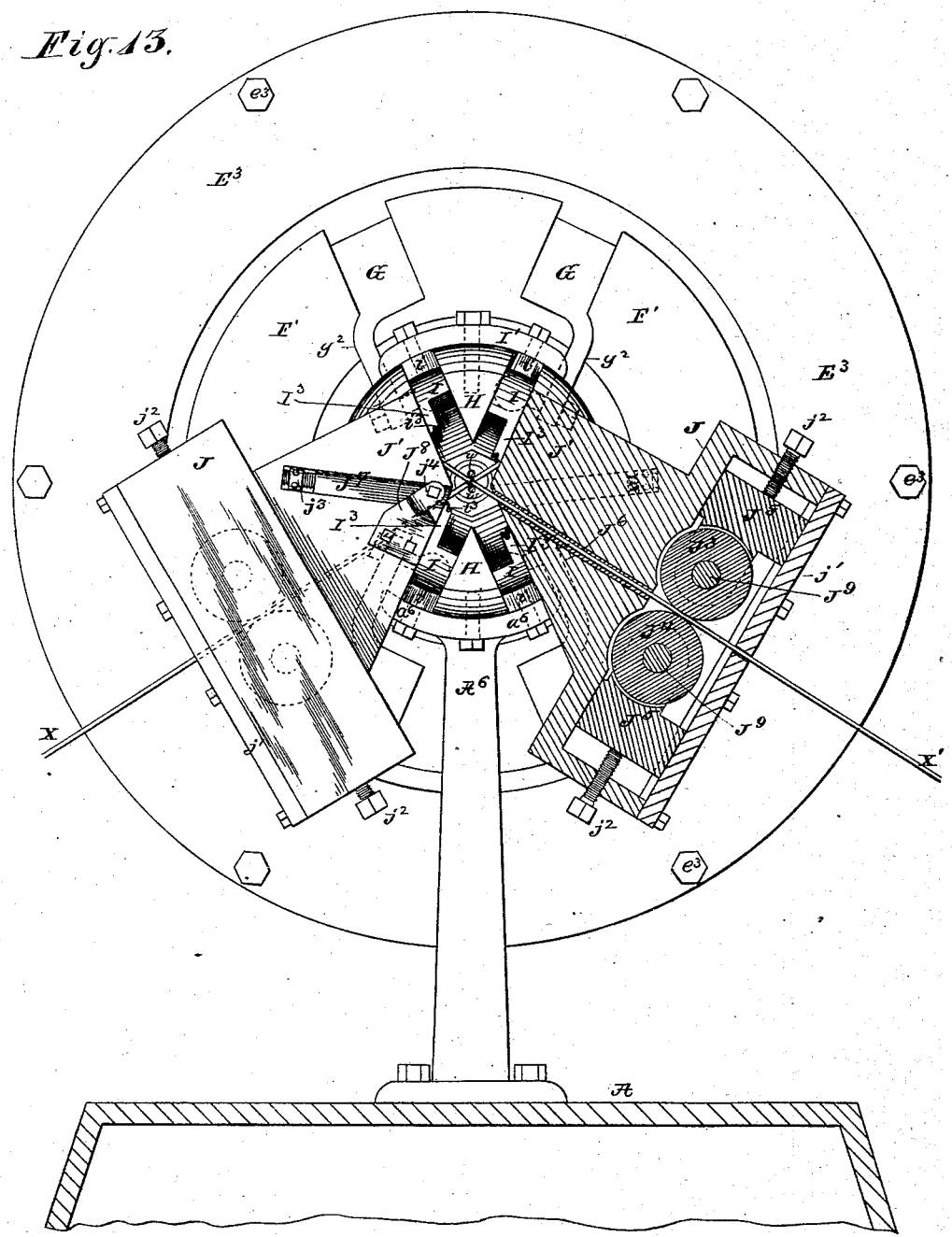

In the accompanying drawings, Figure 1 is a side elevation of a machine containing our improvements. Fig. 2 is a top or plan view of the same. Fig. 3 is a fragmentary view in side elevation, showing the cams and reeling mechanism somewhat enlarged. Fig. 4 is a perspective view of a parti-spherical head, recessed to receive the barb-shapers. Fig. 5 is a transverse section of the machine through *x x* of Fig. 1, and enlarged from said figure. Fig. 6 is a top or plan view of the special mechanism shown in Fig. 5. Fig. 7 is a horizontal section through the parts more especially concerned in forming the barbs, or, say, through *x x* of Fig. 8. Fig. 8 is an elevation of interior parts of the barbing mechanism revealed through section *y y* of Figs. 1 and 7. Fig. 9 is an oblique section of the said barbing mechanism through *x x* of Fig. 10, and Fig. 10 is a vertical section through *z z* of Figs. 1 and 9. Figs. 11 and 12 are horizontal sections of the plugged tube by which the cable is twisted and untwisted, somewhat enlarged from Fig. 9. Fig. 13 is a front elevation of the barbing mechanism. Figs. 14, 15, and 16 are views illustrating the formation and method of making the barbs. Figs. 17 to 33 are details.

A is the bed of the machine, and A' A' are uprights supporting said bed at a suitable height to bring the working parts of the machine into position convenient for the operator.

$A^2$, $A^3$, $A^4$, $A^5$, and $A^6$ are uprights rising from the bed, all but the last of which furnish bearings for rotating parts, as will be further explained.

To first give a cursory description of the main operative parts of the machine in their order with reference to the progress of the fence wires. B' B' are spools for holding and supplying the plain fence-wires $w$ $w$, which spools are mounted on lateral arms of the rotary shaft B, provided with the spur $B^3$. Said shaft B is also provided with the tubes or passages $b^2$, through the bearing-head $B^2$, by which tubes the wires $w$ $w$ pass forward, being twisted as they emerge from the end of the shaft B'. Said shaft B and its said attachments constitute a "flier" for supplying the wire and furnishing the necessary movements to the spools to enable the wires to be twisted into cable form.

C is the driving-belt pulley on the shaft C', mounted in bearings $c$ $c$ on lateral projections of the uprights $A^3$ and $A^5$.

$C^2$ is a fixed pinion engaged with the flier-spur $B^3$, and giving a continuous motion to said flier.

D is a tube mounted at its rear end in the bearing $d$ of the upright $A^4$, being arranged in line with the shaft B of the flier, and having its principal rotary movement in the same direction with said flier. Throughout a considerable portion of its length said tube D is supported in a stationary or non-rotating shaft, F. (Shown detached in Fig. 20, and in its relation to surrounding parts in Figs. 7 and 9.) Said tube D is provided with the fixed pinion D', in the position shown in Figs. 1 and 2, through which it is actuated from the shaft C'. At its opposite end the tube D has the interior plug, $D^2$, (seen more clearly in Figs. 11 and 12,) which plug has two horizontal apertures for the passage of the fence-wire strands $w$ $w$, as also seen in said Figs. 11 and 12. Said tube D is actuated intermittently for the purpose of alternately twisting the cable in that portion of the latter which has passed through the apertures of the plug $D^2$, and supporting the wires while the barb is being applied. The tube D, being thus intermittently actuated while the flier rotates continuously, it follows that during the period of time in which the tube is at rest the wires $w$ $w$ will be twisted from the point where they enter the plug $D^2$ back to the flier. This twist must be taken out to allow the wires to be again fed forward, and the twist transferred to that portion of the wires beyond the plug. To accomplish this, the tube D, when in motion, must manifestly rotate faster than the flier. This more rapid motion is given by means of a gear-wheel, $C^3$, on the driving-shaft C', larger than the wheel $C^2$, which actuates the flier, as plainly shown in Fig. 2. Said spur $C^3$ is loose on the shaft C, and is provided with a clutch-hub, $C^5$, intermittently engaged by the gland $C^6$, as will be further explained.

E is the spur of the cams which actuate the intermittently-moving mechanism, which cams are in continuous rotation by engagement of said spur E with the pinion $C^4$, fixed on the tube C'.

E' is an externally-grooved cam, which, through the medium of the slide $E^5$, reciprocates the gland $C^6$ and operates the loose spur $C^3$, which latter, as stated, is in permanent engagement with the pinion D' on the tube D.

$E^2$ is a second externally-grooved cam, also in rotation through connection with the spur E, and operating the mechanism by which the cable-wire is intermittently drawn forward as fast as the same is barbed, and is disposed of finally upon the reel M'. The conjoined parts E, E', and $E^2$ form a shell connected with interior parts, as shown in Figs. 7, 8, 9, and 10, which operate to apply the barb to the cable at a point just in advance of the plug $D^2$ of the tube D. These matters will form the subject of full description hereinafter. The barb is composed of two wires fed transversely to each other, as shown in Fig. 13.

The parts lettered J to $J^{10}$ and $j$ to $j^7$ are parts concerned in intermittently feeding said barb-wires forward to the position with reference to the main wires shown in Fig. 13, and will be fully described hereinafter.

X X' represent the barb-wires, and $X^2$ $X^2$ reels laterally placed, as shown plainly in Fig. 2, from which said barb-wires are fed to the machine.

K K is an extension of frame A, for the support of parts concerned in drawing forward and in spooling the finished barbed wire, of which parts L is a sprocket-wheel arranged on a transverse shaft, L', and adapted to engage with the barbs of the completed fence-wire, as shown. Said sprocket is intermittently actuated by the pawl $N^3$, engaging the pins $l^2$, which form a ratchet on the sprocket, said pawl being pivoted to the slide N, which is reciprocated by the cam $E^2$. Motion is communicated from the shaft L', on which the sprocket-wheel L is mounted, to the spool-shaft M by the sprocket-chain $M^6$, and also to the grooved cam $M^5$ by the gear-wheels $L^4$ and $M^4$. Said cam $M^5$ works the spool M' back and forth longitudinally on the shaft M, to distribute the wire evenly thereon, by means of the vibrating lever $M^3$, fulcrumed at $k$ to the arm K', and engaged with the spool M' by its grooved hub and with the cam $M^5$ by a suitable pin. The spool is removably held on the shaft M by the clutches $m'$ $m^2$, both of which are feathered in the usual manner to said shaft to slide thereon, subject to the action of the lever M³, engaged with the clutch m', as stated.

Having given above a description of the general arrangement of our machine and a sufficient description of some of its parts, we next proceed to describe more fully the more distinctive operative parts, being mainly those by which the barbs are formed and by which the consecutive movements in the machine are produced.

As before stated, F represents a hollow non-rotating or stationary shaft. It has its rear end firmly held by the upright A⁵, and is connected at its front end with the head H, which in turn is rigidly supported by the upright A⁶. Within the shaft F, as also before stated, is located the intermittently-rotating tube D, carrying the fence-wires $w$ $w$, as shown in Figs. 3, 11, and 12.

Mounted rigidly on the shaft F is a hollow cylindric casting, F'. (Seen in vertical section through its axis in Fig. 22 and in vertical transverse section in Fig. 23.) Said casting has a hub, $f'$, fitted to the shaft F at $f$, by which it is duly secured and supported. The outer surface of the casting F' constitutes a bearing for the external rotating parts, (shown plainly in Figs. 7 and 9,) and consisting, first, of the inner grooved cam, G', which bears directly on the cylinder F'; second, the outer cams, E' and E², and the annular rack or spur E; and, third, the intermediate frame-piece, E⁴, to which the said cams and spur are adjusted and rigidly joined by suitable bolts. These parts so connected are held in place on the cylinder F' by the fixed flange $f^2$ at the front end of the cylinder and the removable plate F⁵, which, as shown, is bolted to the opposite end of said cylinder, and forms a second flange bearing against the part G'.

Figure 17:
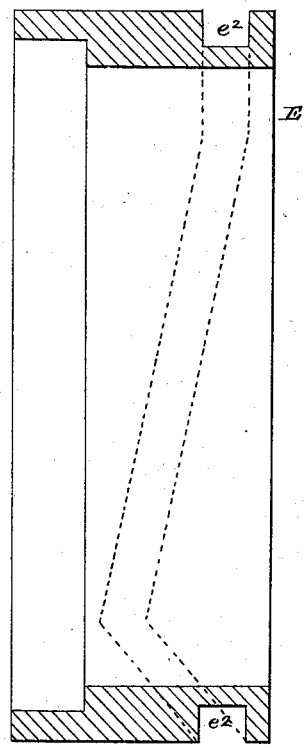
Figure 18:
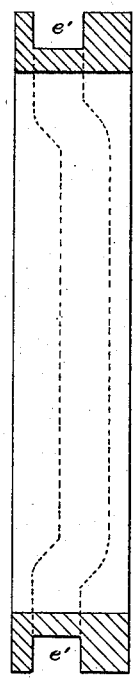
Figure 19:
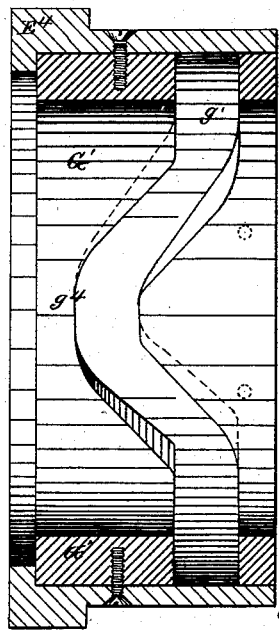

The several moving parts mentioned (with the exception of the annular rack E) are shown in detail and detached in Figs. 17, 18, and 19. The function of each of the cams E' and E² has already been generally stated. That of the inner cam, G', is to actuate, successively, a set of plungers by which the two wires which form the barb are, one after the other, bent to lock with each other and with the fence-wires $w$ $w$. For this purpose the cylinder F' is provided with four longitudinal recesses, $f^3$, (shown plainly in Fig. 23 and in other figures,) in which are fitted the sliding bars G, which have the roller-projections $g$ fitted to the grooves $g'$ of the interior cam, G'. Said groove $g'$ being of zigzag form, as seen in Fig. 19, the rotation of the cam G' gives a reciprocating motion to the bars G, which bars are obviously held in place in the recesses $f^3$ by said surrounding cam G'.

The head H (shown detached in Fig. 4) is of parti-spherical form, being truncated to afford an outer front face at right angles with the axis of the tube D. In the surface of said head and in radial planes thereof are cut grooves $h$, to which are fitted the curved reciprocating plungers I, by which the wires forming the barb are bent and secured in a manner hereinafter fully set out. Said plungers are connected with and actuated by the reciprocating bars G by the rods I², pivoted to the rear ends of the plungers at $i^2$, Fig. 9, and at their opposite extremities adjustably connected by set-nuts to eyes $g^3$, Figs. 9 and 27, pivoted in the arms $g^2$ at the front ends of said bars G. The recesses or grooves $f^3$ in the casting F', and the grooves $h$ in the head H are preferably located in line with each other and in positions relative to a vertical plane. (Shown clearly in Figs. 8, 10, 13.) In other words, two of said grooves $h$ are in the lower surface of the head H, and the opposite two are in the upper surface of said head.

For the purpose of retaining the plungers I I in their respective grooves, and to furnish a means of adjustment by which they may be accurately guided as they shall wear in use, bearing-plates $i$ are inserted in said grooves exterior to the plungers, which plates are adjustably held by means of set-screws $i'$, passing through exterior fixed plates. The lower of such exterior fixed plates is formed of a flange, $a^6$, on the top of the upright A⁶, and is shaped to fit the exterior surface of the head H, and is bolted thereto. The upper of said plates I' is similarly shaped and bolted to said head. The plungers I I being curved in the arc of a circle, and being seated in grooves of corresponding shape, when they are thrust forward they pursue the course of the same arc, and their forward ends are carried in opposite directions past the center of the head H and in front of the same. Said plungers are preferably made broad throughout a greater portion of their length, and at their free or front ends reduced or cut away on their inner sides to give narrow ends I³, as seen in Fig. 13, so that when opposite plungers are reciprocated said ends may pass each other, one carrying down the upper end of the barb-wire, and the other or lower plunger, by its sharpened edge, $i^4$, first severing the barb at its lower extremity, and then carrying said extremity upward past the fence-wire simultaneously with the corresponding movement of the opposite upper plunger. The plungers may of course be of the same thickness throughout their length as that shown of their ends I³, in which case they will be arranged in paralled planes, so that one shall pass at one and the other at the other side of the fence-wire, as now true of the ends I³.

To accomplish the simultaneous movement of opposite plungers, the groove $g'$ in the interior cam, G', by which the bars G and the plungers I I are reciprocated, is provided with two opposite and similar offsets, $g^3$, one of which is shown in Fig. 19. By this means, also, but one pair of said plungers is actuated at the same time, and the first pair actuated is retracted out of the way before the second pair reaches the intersection of the grooves $h$. The free or forward ends of said plungers are in other respects peculiarly shaped, for the purpose of holding and bending the barbs—that is to say, they are brought to an edge, $i^4$, on their outer side faces in contact with the walls of the grooves $h$—and are provided with the notches $i^3$, into which the ends of the barb slip, and in which they are held until bent to their final form and released. Viewed laterally, said notches are seen to be rounded from front to rear, as shown in the sectional figure 16, wherein one of the barbs is shown in the act of being bent, and one of the plungers I is shown in longitudinal section at its free end.

J J are cast-iron boxes, in which are mounted the barb-wire-feeding rollers $J^3$ and $J^4$, having their axes parallel with the fence-wire, and therefore adapted by their position to feed the barb-wire X X' inward transversely to said fence-wire, as shown in Fig. 13. Said boxes are provided with stout lugs J', having cup-shaped flanges $j$, fitted to the head H, as seen in Fig. 7, by which they are rigidly secured to said head.

Within the lugs J' are the small passages $J^6$, preferably lined with steel tubing of proper size to receive the cross or barb wires X X', and directed to feed said cross-wires in the upwardly-inclined directions shown in Fig. 13, so as to intersect each other in the axes of the fence-wire close to the plugged end of the tube D, which forms a support for the strands $w\,w$ of said fence-wire, and operates by the apertures $d\,d$ to hold them separated, so as to admit the intersecting barb-wires between them, as indicated in Figs. 12 and 13. The lugs J' are shaped on their proximating faces to coincide with the outer walls of the grooves $h$ in the head H, as also seen in Fig. 13, forming an outward extension of said outer walls of these grooves, against or approximate to which the outer faces of the plungers I slide in the above-mentioned reciprocating motion thereof. The tubes or passages $J^6$ in said lugs J' are situated to bring the emerging portions of the cross or barb wires in the course or path of the lower of said plungers, and said lower plungers operate as cutters to sever the barbs from the barb-wires X X'. To facilitate this action, steel supports $J^7$ for the barb-wires are arranged to oppose the cutting ends of the plungers, being preferably made adjustable longitudinally by means of the set-screws $j^3$, (seen in Fig. 13,) in order that the plungers may pass the ends of the said supports closely, and therefore make clean cuts of the barb-wires.

It is obvious that a cut produced by the plungers will be oblique to the axes of the barb-wires, and will therefore give sharpened points to said barbs. It is also obvious that the ends of said barb-wires X X', beveled by being cut, as described, will, when advanced, bear with their beveled faces fairly against the upper inner faces of the lugs J', which serve as stops for said wires, arresting them in position to be engaged by the upper plungers in their descent. It is therefore plain that in the forward movement of opposite upper and lower plungers the ends of the severed barb will be caught in the notches $i^3$ of the plungers, and bent forward and past each other in planes substantially parallel with the fence-wires, one on one side and the other on the other side of the fence-wire, and past its opposite sides.

Preparatory to severing and bending the barbs the cable-wires are brought to rest longitudinally and at the outer face of the plug $D^2$, and thence forward. The cable W is at rest with reference to its rotation also, the tube D having completed its rotation and standing with the cable-wires $w\,w$ emerging therefrom, one above the other, as shown in vertical section, Fig. 12. Said cable-wires converge just in advance of said tube-plug $D^2$, leaving a crotch through which the barb-wires are advanced, and in which they stand prior to being bent, as also shown in Figs. 12 and 13. The first barb cut and bent is X, being that which lies at the rear of the other and next the plug $D^2$. In Fig. 14 said barb is shown by full lines just after having been severed and grasped in the notches of the opposite plungers I, and in dotted lines after being bent to its final form. In having its ends carried forward and past the cable-wire—one at each side of the latter—and its ends reversed, as shown, said barb is evidently coiled by an open or spiral coil once around the other wire, X'; or, in other words, an open eye is formed in its middle, which embraces the wire X'. It is also evident, and in Fig. 16 it is shown, that the spirally-inclined sides of said eye follow the oblique direction of and lie alongside the several fence-wires $w\,w$ of the twisted cable. After the first barb, X, has been bent and the pair of plungers concerned in its formation have been retracted, the second pair of plungers advance and sever the wire X', seizing the barb thus cut off, as shown in Figs. 15 and 16. It is of course desirable that the points of the completed barb shall stand at right angles with each other as nearly as possible. The plungers are not, as here shown, in positions relative to each other to produce this effect. Wherefore, when the second barb has been fairly seized by the plungers, so as to be held in the notches of said plungers, the tube D is rotated in an opposite direction from that which it takes in forming the cable-twist or when actuated by the spur $C^3$ and is carried—say, something less than a quarter of a turn—backward, bringing the first barb already formed into the relative position shown in Fig. 15. Meantime the plungers operating upon the barb X' continue their forward movement, and, reversing the ends of said barb, leave them thrown across the ends of the barb X about at right angles therewith and exterior to the cable, as also shown in Fig. 15.

Fig. 16 is intended to represent a vertical section of the tube D after this backward rotation.

Means for giving the partial backward rotation to the tube D are shown in Figs. 5 and 6, and will be again referred to.

Fig. 15, which shows in dotted lines the final position of the second barb formed, also sufficiently represents in front elevation the shape of the entire barb when completed, which need not for the purposes of this patent be further illustrated, said barb by itself forming the subject of another application for patent filed by one of the present inventors.

Two cycles of movements are produced and two double barbs applied at each rotation of the spur E, and the timing of the movements is accomplished by adjustment of the cams E', E², and G' and the spur-rack E on the frame-piece E⁴. The short backward movement of the twisting-tube D is effected by means of the ratchet O on the tubular shaft D (located just back of the upright A⁵) and the rack-pawl O', engaging said ratchet. Said pawl is applied to a bar, O², which has a longitudinally-reciprocating movement on the pins $o$, fitted to slots $o'$ in said bar, and holding said bar in place against the upright A⁵. The pawl when out of engagement with the ratchet is, with the bar O², carried downward out of the way of the ratchet, preferably by the spring O⁴, so as to just clear the ratchet, and is lifted by means of the horizontal lever O³, connected with the bar O², and pivoted to the upright A⁵, as shown, and provided with a forward projection, $o^2$, having a friction-roller on its free end in position to be struck, successively, by the upward-acting cam-lugs $e\,e$, bolted or cast in proper position on the spur E.

The several parts are not asserted to be accurately shown in either figure of the drawings in position to give the requisite timing of the several movements. It is sufficient to say that the disengagement of the clutch C⁵, the beginning of the backward stroke of the bar N, and the advance of the first pair of plungers I should be about simultaneous, all of which may, as already stated, be effected by adjustment of the cams E', E², and G' on the connecting frame-piece E⁴, while the adjustment of the lugs $e\,e$ on the spur E may be easily made to give the required backward partial turn to the tube D to accompany the movement of the second pair of plungers I, as above explained.

To prolong the period of retraction of the cable feed-bar N, and consequently the period during which the cable is longitudinally at rest, in which period both sets of plungers must act, the retreating portion of the cam-groove $e^2$, by which said feed-bar N is retracted, may be extended the greater part of a half-circumference, and the advancing part of said groove made correspondingly more abrupt to complete the half-circumference, as indicated in Fig. 17. The plungers are set at a small angle with each other, in order that both pairs may be actuated in the proper interval by a single cam-groove, $g$; but they may be set at right angles or still farther spread by providing two such cam-grooves in the part G', one groove for each pair of plungers. In the latter case the direction of feed for the barb-wires X X' will also be changed, and the backward rotation of the tube D will be unnecessary.

To next explain the mechanism by which the barb-feeding rollers J³ J⁴ are actuated, reference is made to Figs. 7 and 8. The lower of said rollers on the right of Figs. 8 and 13 or on the upward moving side of the cam-cylinders, and the upper of said rollers on the opposite side, have their shafts J⁹ extended back into the chamber formed by the overhanging cam-cylinder E², and are supported at their rear or inner ends by bearings in the arms F², projecting from the stationary shaft F. Said shafts J⁹ are provided with pin gear-wheels J¹⁰, one in front and the other at the rear of its supporting-arm F², which pin-wheels respectively engage with the two pins $j^6$ on the inner vertical face of the plate E³, and the two pins $j^7$, projecting forward from the outer vertical face of the plate E⁴. The remaining or opposing feed-rollers are provided with shorter shafts extending backward from the boxes J, and the shafts of each pair of feed-rollers are provided with the intermeshing pinions $j^5$. The pins $j^6$ and $j^7$ being properly placed, the necessary inward movement of the proximate surfaces of the feed-rolls J³ J⁴, embracing the barb-wires, is given at the proper time to carry the said wires forward into position shown in Fig. 13.

Figure 28:
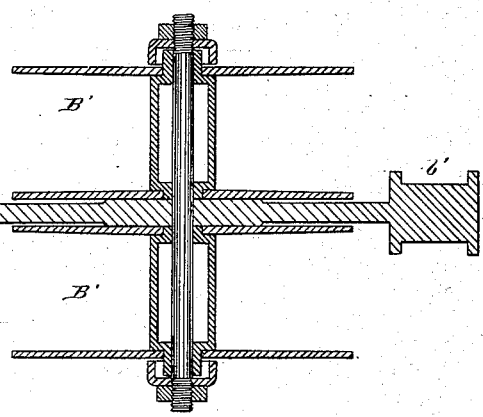
Figure 29:
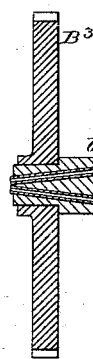
Figure 30:
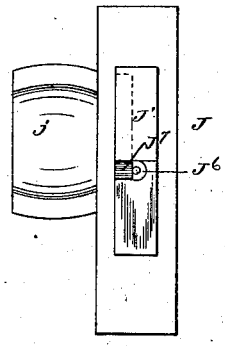
Figure 31:
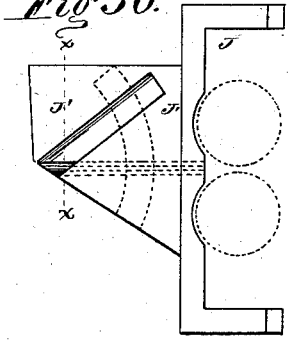
Figure 33:
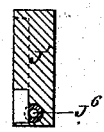
Figure 32:
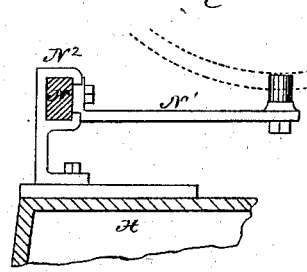

Of the detail figures of the drawings not above described, Figs. 24 and 25 are respectively side and plan views of the plates J⁸, Fig. 13, secured to the lug J', and provided with an overhanging projection, $j^4$, through which a set-screw passes to bear upon the inner end of the barb-supports J⁷. Fig. 26 is a side elevation of the reciprocating bar G detached, and Fig. 27 is a transverse section thereof through $x\,x$ of Fig. 26. Fig. 28 is a longitudinal section through the flier from which the plain wire is supplied to the barbing mechanism. Fig. 29 is a side elevation of one of the castings which support the barb-wire-feeding rollers, showing the cup-shaped flange $j$, by which said casting is secured to the head H. Fig. 30 is a front elevation of said casting with the outer wall of the roller-box removed. Fig. 31 is a section through $x\,x$ of Fig. 30. Fig. 32 is a plan view of the reciprocating bar N, concerned in feeding forward the cable, showing a lateral arm, N', bearing an upwardly-projecting friction-roller stud, $n'$, which enters the groove $e^2$ of the cam E²; and Fig. 33 is an end elevation of the parts shown in Fig. 32, showing by dotted lines the relation thereto of the said cam-cylinder E².

We claim as our invention—

1. In a machine for twisting and barbing fence-wire, the combination, with a continuously-rotating flier which supplies the plain wire, with mechanism for intermittently carrying forward the cable, and with barbing mechanism arranged to operate when the cable is longitudinally at rest, of an intermittent twister, as D D², located intermediate to the flier and spooler, and having a speed when in motion greater than that of the flier, substantially as described, and for the purposes set forth.

2. In a machine for barbing fence-wire, the combination, with intermittent mechanisms for barbing the wire and for carrying the same forward to the spools, of cams for producing the intermittent motions of these mechanisms, arranged and rotating around the axis of the fence-wire, substantially as shown.

3. In combination with the continuously-rotating flier, with intermittent mechanism for carrying forward the cable, with an intermittent and intermediate twister, and with barbing mechanism arranged to operate when the cable is longitudinally at rest, the continuously-rotating spur E, having connected therewith a series of cams arranged to rotate about the axis of the wire, and constructed and connected to actuate the said intermittent mechanisms, substantially as described.

4. In combination with the continuously-rotating spur E, carrying the actuating-cams, and with the intermittently-rotating twister, D D², provided with a pinion, D', the driving-shaft C', having the fixed pinion C⁴, and the loose spur C³, provided with the clutch C⁵, together with the sliding gland C⁶, actuated from a cam carried by the spur E, substantially as described.

5. In combination with a central support, D², for the fence-wires, and with mechanism for feeding the barb-wires X X', so as to intersect each other between the fence-wires in proximity to the support D², two pairs of opposite plungers, I I, and suitable actuating mechanism therefor, said plungers being constructed and arranged to sever the barbs and to successively carry their ends forward in planes substantially parallel to the plane of the fence-wire and on opposite sides thereof, as set forth.

6. In combination with the central support, D², for the fence-wires, the stationary head H, having two pairs of opposite curved recesses, as shown, combined with the curved plungers I I, fitted to said recesses, and actuated by suitable mechanism to reciprocate them in pairs successively for the formation of a four-pointed barb, substantially as set forth.

7. In combination with the rigidly-supported cylinder F', arranged about the axis of the fence-wires, and provided with grooves $f^3$ to receive the bars G, said bars G provided with studs $g$, the plunger I, connected with said bars, and the continuously-rotating cam G', surrounding the cylinder F', and engaged with the studs $g$ by the grooves $g'$, substantially as described, and for the purposes set forth.

8. In combination with barbing mechanism, with mechanism for carrying forward the fence-wire, and with the central twister, D D², and its connections, the stationary shaft F, the cylinder F', supported from the shaft F, and the cams E', E², and G', arranged and provided with means for being continuously rotated on the cylinder F', substantially as described, and for the purposes set forth.

9. In combination with means for holding the fence-wires spread a short distance at the rear of their convergence in the twisted cable, and with mechanism for feeding and supporting the barb-wires, so as to intersect each other in the crotch of the fence-wires thus produced, the two pairs of opposite plungers I, provided with notches $i^3$, two of the plungers having sharpened ends $i^4$, said plungers being thereby adapted to sever the barbs and to seize their opposite ends, and means for successively actuating said plungers in the direction indicated, to reverse the ends of the several barbs and to form a four-pointed barb whose ends cross each other exterior to the cable, substantially as set forth.

10. In combination with the curved plungers I and the reciprocating bars G, the adjustable connecting-rods I², joining the plungers and bars to regulate the distance between them, substantially as described.

11. In combination with the plungers I and reciprocating bars G, the rods I², pivoted to the plungers, the eyes $g^3$, pivoted to the bars, and means for adjustably securing the said rods I² in said eyes, substantially as described.

12. In combination with the head H, having grooves $h$, and with the barbing-plungers I, located in said grooves, the adjustable bearing-plates $i$, external fixed plates, I' $i^6$, and the set-screws $i'$, substantially as and for the purposes set forth.

13. In combination with the twister D D², operating to support the fence-wires at the point at which the barbs are applied, and with the two pairs of plungers I, arranged, as shown, and operating to bend the barbs successively, of mechanism for giving a partial backward rotation to the fence-wires after the first barb is bent, whereby the ends of the barbs may cross each other at a right angle, substantially as set forth.

14. In combination with the twisting-tube D and means for successively engaging it with and releasing it from the mechanism by which it is forwardly rotated, the ratchet O, secured to said tube, the pawl O', suitably arranged to backwardly rotate the twister, and means for actuating said pawl, substantially as and for the purposes set forth.

15. In combination with a pair of feed-rolls having their axes substantially parallel with the direction of the fence-wire, the shaft of one of said pair of rolls extended backward and intermittently engaged with a part in rotation about the axis of the fence-wire, substantially as described.

16. In combination with the feed-roller shaft J⁹, provided with a pin gear-wheel, as shown, one or more pins projected from a part having a rotating movement about the axis of the fence-wire in position to engage the pin-wheel, substantially as described.

17. In combination with the two pairs of feed-rolls arranged and supported at the sides of the barbing mechanism, as shown, the prolonged shafts $J^9$ of one upper and one lower roller, the pin gear-wheels $J^{10}$, secured to said shafts, and the several pins $j^6$ and $j^7$, projected in opposite directions from connected rotating parts and severally engaging said wheels, substantially as described.

18. In combination with the plungers I and with the grooved support H for said plungers, the metal parts J', apertured to guide the barb-wires when fed forward, and having their faces shaped to coincide with the outer walls of the grooves $h$, substantially as described, and for the purposes set forth.

19. In combination with the head H, having grooves $h$, and with the plungers I, fitted to said grooves, the barb-wire feed-roller supports J, provided with lugs J', secured to the head, said lugs being faced to form prolongations of the outer walls of the grooves $h$ and apertured to guide and support the barb-wires, substantially as described.

20. In combination with the cam $E^2$ and sprocket L, provided with a ratchet, $l^2$, the slide N, engaged with the cam $E^2$, and provided with the pawl $N^3$, engaged with the ratchet $l^2$, substantially as described.

21. In combination with the sprocket-shaft L', suitably actuated, as described, the spool-shaft M, having a sliding spool, M', the cam $M^4$, and the spool-shifting lever $M^3$, together connected, and operating substantially as set forth.

22. In combination with the cutting-plungers I, the longitudinally-adjustable barb-wire supports $J^7$, arranged and operating substantially as set forth.

In testimony that we claim the foregoing as our joint invention we affix our signatures in presence of two witnesses.

ORLANDO P. BRIGGS.
CHARLES S. LOCKE.

Witnesses:
M. E. DAYTON,
JESSE COX, Jr.